United States Patent
Falter et al.

(10) Patent No.: US 10,684,261 B2
(45) Date of Patent: Jun. 16, 2020

(54) ULTRASONIC BAR AND TUBE END TESTING WITH LINEAR AXIS ROBOT

(71) Applicant: General Electric Company, Schenectady, NY (US)

(72) Inventors: Stephan Falter, Simmerath (DE); Alexander Felix Fiseni, Köln (DE); Stephan Schmitz, Cologne (DE); Daniel Koers, Huerth (DE); Matthias Erhard Schwabe, Cologne (DE)

(73) Assignee: General Electric Company, Schenectady, NY (US)

( * ) Notice: Subject to any disclaimer, the term of this patent is extended or adjusted under 35 U.S.C. 154(b) by 271 days.

(21) Appl. No.: 15/468,212

(22) Filed: Mar. 24, 2017

(65) Prior Publication Data

US 2017/0284973 A1 Oct. 5, 2017

Related U.S. Application Data

(60) Provisional application No. 62/316,895, filed on Apr. 1, 2016.

(51) Int. Cl.
*G01N 29/22* (2006.01)
*G01N 29/265* (2006.01)
(Continued)

(52) U.S. Cl.
CPC ......... *G01N 29/225* (2013.01); *G01N 29/223* (2013.01); *G01N 29/24* (2013.01);
(Continued)

(58) Field of Classification Search
CPC .... G01N 29/225; G01N 29/27; G01N 29/265; G01N 29/223; G01N 29/4445;
(Continued)

(56) References Cited

U.S. PATENT DOCUMENTS

| 5,945,113 A | 8/1999 | Meinard et al. |
| 6,467,138 B1 | 10/2002 | Aimé |

(Continued)

FOREIGN PATENT DOCUMENTS

| CN | 102759570 A | 10/2012 |
| CN | 103969336 A | 8/2014 |

(Continued)

OTHER PUBLICATIONS

Magnetic Analysis Corporation web page: http://www.mac-ndt.com/applications/inspecting-tube-ends/, Copyright date indication 2014.

(Continued)

*Primary Examiner* — Xin Y Zhong

(74) *Attorney, Agent, or Firm* — Mintz Levin Cohn Ferris Glovsky and Popeo, P.C.

(57) ABSTRACT

An inspection system for performing an inspection of an end region of a part is provided. The inspection system includes a robotic assembly positioned along a side of the part. The inspection system includes an ultrasonic probe coupled to the robotic assembly and positioned in proximity to the end region of the part. The ultrasonic probe is moved by the robotic assembly along a path to inspect the end region of the part. During the inspection, the ultrasonic probe transmits a signal towards the end region of the part and receives a reflected signal from the end region of the part. The inspection system provides, as a single system, for inspection of both a body of the part and the end region of the part.

8 Claims, 5 Drawing Sheets

(51) Int. Cl.
*G01N 29/26* (2006.01)
*G01N 29/27* (2006.01)
*G01N 29/24* (2006.01)
*G01N 29/28* (2006.01)
*G01N 29/44* (2006.01)

(52) U.S. Cl.
CPC ......... *G01N 29/262* (2013.01); *G01N 29/265* (2013.01); *G01N 29/27* (2013.01); *G01N 29/28* (2013.01); *G01N 29/4445* (2013.01); *G01N 2291/2634* (2013.01); *G01N 2291/2638* (2013.01)

(58) Field of Classification Search
CPC ...... G01N 29/28; G01N 29/24; G01N 29/262; G01N 2291/2638; G01N 2291/2634
See application file for complete search history.

(56) References Cited

U.S. PATENT DOCUMENTS

| | | | |
|---|---|---|---|
| 6,935,178 | B2 | 8/2005 | Prause |
| 6,945,113 | B2 | 9/2005 | Siverling |
| 7,114,406 | B2 | 10/2006 | Wright |
| 7,181,970 | B2 | 2/2007 | Haase |
| 8,365,603 | B2 | 2/2013 | Lesage |
| 8,833,169 | B2 | 9/2014 | Lute, Jr. |
| 2006/0162457 | A1* | 7/2006 | Chatellier ............ G01N 29/043 73/627 |
| 2013/0145850 | A1* | 6/2013 | Lute, Jr. ............... G01N 29/043 73/619 |
| 2014/0000372 | A1 | 1/2014 | Bessri |
| 2015/0253288 | A1 | 9/2015 | Spencer et al. |
| 2016/0123933 | A1* | 5/2016 | Fetzer .................. G01N 29/225 73/634 |
| 2016/0320344 | A1* | 11/2016 | Spencer ............... G01N 29/043 |

FOREIGN PATENT DOCUMENTS

| | | |
|---|---|---|
| DE | 102 59 653 B3 | 4/2004 |
| DE | 101 41 768 A1 | 4/2013 |
| EP | 1 423 689 B1 | 12/2005 |
| EP | 2 686 673 B1 | 3/2015 |
| GB | 2497418 A | 6/2013 |
| WO | 97/13144 A1 | 4/1997 |

OTHER PUBLICATIONS

Magnetic Analysis Corporation brochure: Echomac® UT End Tester for Tube & Pipe, dated Mar. 2014.

Extended European Search Report and Opinion issued in connection with corresponding EP Application No. 17163827.3 dated Aug. 7, 2017.

* cited by examiner

ULTRASONIC BAR AND TUBE END TESTING WITH LINEAR AXIS ROBOT

RELATED APPLICATION

The present application is a non-provisional application and claims benefit of priority from U.S. Provisional Patent Application No. 62/316,895, which is incorporated herein by reference.

BACKGROUND

Ultrasonic testing may be performed for detection of defects in a part (e.g., tubes, bars, etc.). Ultrasonic testing is a form of non-destructive testing, in which one or more properties of a par (e.g., cracks, tube wall changes, deformities, weaknesses, wall thickness, etc.) may be evaluated without causing damage to the part material. Ultrasonic testing typically involves directing an ultrasonic wave into the part from a first location, and receiving either a reflected wave back at the first location, or an attenuated wave at a second location. Based on the characteristics of the received wave (e.g., reflected wave, attenuated wave, etc.), the properties of the part can be determined.

In applications related to tube mills, drill pipes, casings, etc., existing inspection systems can test a portion (e.g., a central region) of a tube to examine for defects. While existing inspection systems are capable of inspecting the central region of the part, such inspection systems have been unable to and/or had difficulty with inspecting end regions of the part. In some applications, these end regions have lengths of about 50 millimeters to about 150 millimeters. To address this issue, the uninspected end regions have either been removed (e.g., via cutting off the end regions) or additional testing equipment has been purchased to inspect the end regions. These aforementioned solutions are both inefficient and costly.

BRIEF DESCRIPTION OF THE DISCLOSED SUBJECT MATTER

The following brief description presents a simplified summary in order to provide a basic understanding of some aspects of the system and/or method discussed herein. This brief description is not an extensive overview of the system and/or method discussed herein. It is not intended to identify key/critical elements or to delineate the scope of such system and/or method. Its sole purpose is to present some concepts in a simplified form as a prelude to the more detailed description that is presented later.

In accordance with one aspect, an inspection system for performing an inspection of an end region of a part is provided. The inspection system comprises a robotic assembly positioned along a side of the part. The inspection system comprises an ultrasonic probe coupled to the robotic assembly and positioned in proximity to the end region of the part. The ultrasonic probe is configured to be moved by the robotic assembly along a path to inspect the end region of the part. During the inspection, the ultrasonic probe is configured to transmit a signal towards the end region of the part, and receive a reflected signal from the end region of the part.

In accordance with another aspect, an inspection system for performing an inspection of an end region of a part is provided. The inspection system comprises a robotic assembly positioned along a side of the part. The inspection system comprises an ultrasonic probe coupled to the robotic assembly and positioned in proximity to the end region of the part. The ultrasonic probe is configured to be moved by the robotic assembly along a plurality of axes with respect to the end region of the part. An angle of inclination of the ultrasonic probe with respect to the end region of the part is configured to be adjusted by the robotic assembly. During the inspection, the ultrasonic probe is configured to receive a reflected signal from the end region of the part.

In accordance with another aspect, an inspection system for performing an inspection of a part that has a body and an end region is provided. The inspection system comprises a robotic assembly positioned along a side of the part. The inspection system comprises an ultrasonic probe coupled to the robotic assembly and selectably positionable in proximity to the body and the end region of the part. The ultrasonic probe is configured to be moved by the robotic assembly along a path to inspect the body and the end region of the part. The ultrasonic probe is configured to, during a portion of the inspection associated with the body, transmit a signal within the body of the part, and receive a reflected signal from within the body of the part. The ultrasonic probe is configured to, during a portion of the inspection associated with the end region, transmit a signal towards the end region of the part, and receive a reflected signal from the end region of the part.

BRIEF DESCRIPTION OF THE DRAWINGS

The foregoing and other aspects of the subject matter disclosed herein will become apparent to those skilled in the art to which the subject matter disclosed herein relates upon reading the following description with reference to the accompanying drawings, in which.

DETAILED DESCRIPTION OF THE DISCLOSED SUBJECT MATTER

Figure 1:
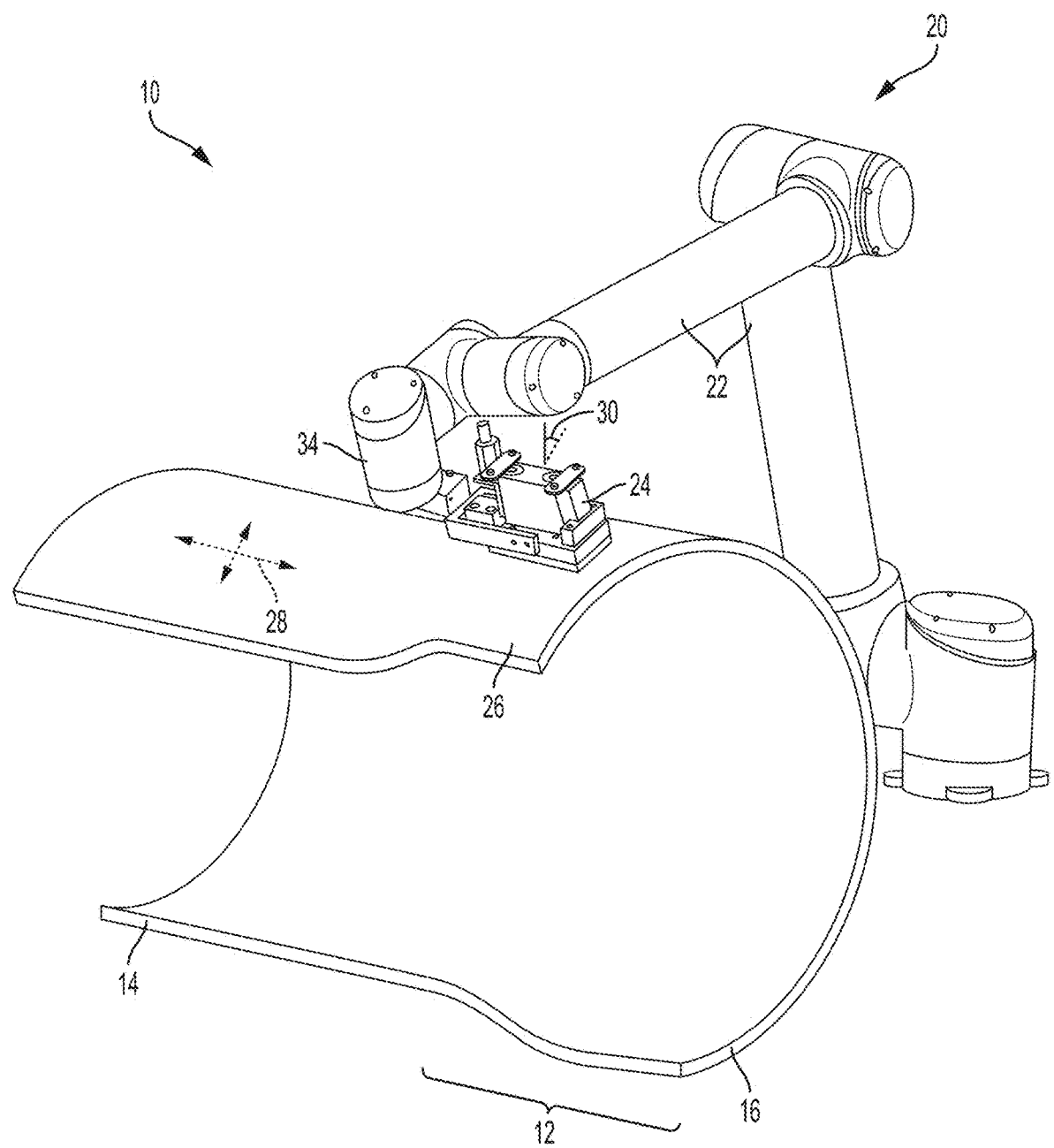
FIG. 1 is a perspective view of an example inspection system having a robotic assembly and an ultrasonic probe for conducting a non-destructive inspection of an end region of a part.

Example embodiments that incorporate one or more aspects of the subject matter disclosed herein are described and illustrated in the drawings. These illustrated examples are not intended to be a limitation on the subject matter disclosed herein. For example, one or more aspects of the subject matter disclosed herein can be utilized in other embodiments and even other types of devices.

In the oil and gas industry, it may be sometimes beneficial to conduct a non-destructive inspection of a part. For example, the part may be associated with drill pipes, casings, machines installed in seamless tube mills, etc. During the inspection, the part may be inspected for defects, such as cracks, tube wall changes, deformities, weaknesses, etc. It is beneficial to inspect not only the body of the part e.g., a region located a distance from end regions of the part), but also end regions of the part. The end regions may comprise, for example, a region having a length of about 50 millimeters to about 150 millimeters located at one or both ends of the part. So as a brief prelude, embodiments of the present disclosure can provide a single system for inspecting both the body and the end regions. Other embodiments are within the scope of the disclosed subject matter.

An inspection system may include a robotic assembly that supports an ultrasonic probe. The robotic assembly can be positioned along a side of the part in proximity to the end region of the part. The robotic assembly can move the ultrasonic probe, such that the ultrasonic probe can conduct a non-destructive inspection of the end region of the part. As such, the part, including both the body and the end regions, can be inspected for defects, such as cracks, tube wall changes, deformities, weaknesses, wall thickness, etc.

FIG. 1 is a schematic illustration of an example inspection system 10 for performing an inspection of an end region 12 of a part 14. The part 14 typically has an overall length (not shown, truncated for illustrative purposes) that is relatively long. In an example, the end region 12 of the part 14 may have a length that is between about 50 millimeters to about 150 millimeters. The end region 12 can be located adjacent to an end 16 of the part 14, and may extend along the length (e.g., 50 millimeters to about 150 millimeters) from the end 16 of the part 14. While one end 16 of the part 14 is illustrated in FIG. 1, it will be appreciated that an opposing, un-illustrated end may be similar in size and shape to the end 16.

In an example, the part 14 (e.g., a tube, a bar, etc.) may include an elongated, hollow structure that extends between opposing ends along a linear or non-linear axis. In some examples, the part 14 may have a cross-sectional shape that is at least partially rounded, such as by having a circular cross-sectional shape, an oval cross-sectional shape, etc. In other examples, the part 14 can have a cross-sectional shape with one or more substantially flat walls, such as by having a quadrilateral (e.g., square, rectangular, etc.) cross-sectional shape, or the like. The illustrated part 14 of FIG. 1 is merely an example of one possible shape, as any number of different sizes, shapes, constructions, etc. are envisioned. In addition, in this example, the part 14 is illustrated as having a portion of the wall missing for illustrative purposes. In other examples, however, the part 14 may extend circumferentially about a hollow bore without portions of the wall missing. Accordingly, it is to be appreciated that the specific part 14 is not a limitation. The teachings provided herein can be applied to any kind of complex geometry (e.g., not limited to just a tube or a bar etc.). For example, it is contemplated to use the teachings upon composite/complex parts.

The inspection system 10 can be positioned along a side of the part 14. In this example, the inspection system 10 may be positioned along an outer radial side of the part 14 at an exterior of the part. In an example, the inspection system 10 can perform a non-destructive inspection of the part 14 without a need for a second inspection system. For example, the inspection system 10 can perform the non-destructive inspection without the need for a second inspection system positioned within the hollow bore of the part 14 at an inner radial side. As such, the inspection of the part 14 can be performed by the inspection system 10 along only one side of the part 14. In the illustrated example, the inspection system 10 can be located adjacent to the end region 12 of the part 14, such that the inspection system 10 can perform the inspection of the end region 12 of the part 14.

The single inspection system 10 can accommodate for aspects that are different at the end region 12 of the part 14 than the remainder of the part 14. In an example, the inspection system 10 can be provided for inspection both the end region 12 of the part 14, and the remainder of the part 14 (e.g., a central region of the part 14), without the need to use two different inspection systems.

The inspection system 10 may include a robotic assembly 20. It is to be appreciated that FIG. 1 shows one, non-limiting example of a robotic assembly 20. This non-limiting example may be an off-the-shelf product from Universal Robots A/S. To be sure, other different robotic assemblies can be used. The robotic assembly 20 may be positioned along the side of the end region 12 of the part 14. It will be appreciated that the robotic assembly 20 illustrated in FIG. 1 is merely exemplary, as the robotic assembly 20 may include any number of structures, constructions, etc. In the illustrated example, the robotic assembly 20 may include one or more arms 22 that are movable/articulable. The robotic assembly 20 may further include structures associated with movement/articulation of the arms 22, such as one or more motors, gears, slides, tracks, electronic components, etc. In a possible example, the robotic assembly 20 may include a linear axis robot, such that the robotic assembly 20 is movable along an axis. In such an example, the robotic assembly 20 may include structures allowing for linear movement, such as a slide, a track, bearings, etc.

The inspection system 10 may include an ultrasonic probe 24. The ultrasonic probe 24 can be coupled to the robotic assembly 20. For example, the ultrasonic probe 24 can be coupled to one of the arms 22 of the robotic assembly 20. The ultrasonic probe 24 can be coupled to one of the arms 22 in any number of ways, such as by mechanical fasteners (e.g., screws, bolts), welding, locking structures, etc. During an inspection, the ultrasonic probe 24 can be positioned in proximity to a surface 26 of the end region 12 of the part 14.

In an example, the ultrasonic probe 24 may include a phased array probe. It is to be appreciated that different types of probes can be used. The type of probe should not be considered to be a limitation. In one, non-limiting example, a phased array two-dimensional matrix probe could be used. In another, non-limiting example, a one-dimensional matrix probe could be used. In such an example, the phased array ultrasonic probe 24 may include a transducer assembly having a plurality of individual probe elements that can be pulsed separately. The probe elements can be arranged in a strip (e.g., a linear array), a ring (e.g., an annular array), a circular matrix (e.g., a circular array), or other shapes. In some examples, the phased array ultrasonic probe 24 may be designed for direct contact with the surface 26 of the end region 12 of the part 14. In other examples, the phased array ultrasonic probe 24 may be designed for use with a coupling fluid that is located between the phased array ultrasonic probe 24 and the surface 26 of the end region 12 of the part 14.

In an example operation, the probe elements of the phased array ultrasonic probe 24 can be pulsed at different times, which may cause a plurality of waves to be emitted from the ultrasonic probe 24. These waves can combine into a single wave (e.g., a signal), which is directed through the surface 26 and into the end region 12 of the part 14. The signal can reflect off defects, such as cracks, tube wall changes, deformities, weaknesses, back walls, etc., in the end region 12 of the part 14. The signal can be steered through various angles, focal distances, focal depths, and focal spot sizes such that the ultrasonic probe 24 can examine a location of the end region 12 of the part 14 across a range of different perspectives.

The phased array ultrasonic probe 24 can receive a reflected signal from the end region 12 of the part 14. For example, the reflected signal (e.g., reflections of the individual waves) can be received by the probe elements of the ultrasonic probe 24. The phased array ultrasonic probe 24 can spatially sort the reflected signal according to the arrival time, amplitude, etc. at each of the probe elements. Ultrasound electronics can then process the reflected signal and display an image of the end region 12 of the part 14.

To perform an inspection of different portions of the end region 12, the ultrasonic probe 24 is configured to be moved by the robotic assembly 20. In an example, the arms 22 can be moved so as to cause the ultrasonic probe 24 to be moved about a plurality of axes 28. In some examples, an angle of inclination 30 of the ultrasonic probe 24 with respect to the end region 12 of the part 14 is configured to be adjusted by the robotic assembly 20.

A path along which the ultrasonic probe 24 is moved may or may not be pre-programmed. For example, depending on the geometry of the end region 12 of the part 14, a path along which the ultrasonic probe 24 is moved by the robotic assembly 20 is pre-programmed. During inspection, the robotic assembly 20 can move the ultrasonic probe 24 along the pre-programmed path. In another example, the path along which the ultrasonic probe 24 is moved may not be pre-programmed. In such an example, the robotic assembly 20 can move the ultrasonic probe 24 based on the geometry of the end region 12 of the part 14. During inspection, the robotic assembly 20 and the ultrasonic probe 24 may adapt to a geometry of the end region 12 of the part 14.

The inspection system 10 may include a fluid delivery structure 34. The fluid delivery structure 34 can deliver a fluid to the end region 12 of the part 14. In some examples, the fluid may include water, oils, creams, gels, etc. The fluid delivery structure 34 may include one or more structures and/or components that are associated with the delivery of fluid. For example, the fluid delivery structure 34 may include one or more of a nozzle, a water delivery conduit (e.g., a hose, a channel, a tube, a pipe, etc.), a device for controlling a passage of the fluid (e.g., a valve), etc.

The fluid delivery structure 34 can be coupled to the robotic assembly 20. It will be appreciated that the fluid delivery structure 34 illustrated in FIG. 1 is merely exemplary, as any number of positions, locations, constructions, etc. of the fluid delivery structure 34 are envisioned. In an example, the fluid delivery structure 34 can be coupled to the robotic assembly 20 in proximity to the ultrasonic probe 24. The fluid delivery structure 34 can therefore deliver the fluid to a location between the ultrasonic probe 24 and the surface 26 of the end region 12 of the part 14. It is contemplated that the fluid delivery structure 34 can be controlled by the robotic assembly 20, such that a direction of fluid delivery by the fluid delivery structure 34 is controllable.

The fluid delivered by the fluid delivery structure 34 can improve the inspection of the end region 12 of the part 14 performed by the ultrasonic probe 24. For example, the fluid can be delivered to a location between the ultrasonic probe 24 and the surface 26 of the end region 12. The fluid can facilitate transmission of ultrasonic signals from the ultrasonic probe 24 to the part 14 and from the part 14 to the ultrasonic probe 24. The fluid can therefore reduce any air gaps and/or the size of air gaps between the ultrasonic probe 24 and the surface 26 of the part 14 that would otherwise interfere with the transmission of the ultrasonic signals.

In an example, there can be relative movement between the part 14 and the inspection system 10. For example, the part 14 can be moved relative to the inspection system 10 along one or more directions. In one possible example, the part 14 can be moved along the elongation direction of the part 14. In another example, the part 14 can be moved, relative to the inspection system 10, rotationally about the elongation direction of the part 14. In yet another example, the part 14 can be moved in a direction that is at an angle with respect to the elongation direction of the part 14, such as by being moved closer to the inspection system 10, further away from the inspection system 10, etc.

In some examples, the inspection system 10 can be moved with respect to the part 14 along one or more directions. For example, the inspection system 10 can be moved parallel to the elongation direction of the part 14. In another example, the inspection system 10 can be moved rotationally about the elongation direction of the part 14. In yet another example, the inspection system 10 can be moved in a direction that is at an angle with respect to the elongation direction of the part 14, such as by being moved closer to the part 14, further away from the part 14, etc.

Figure 2:
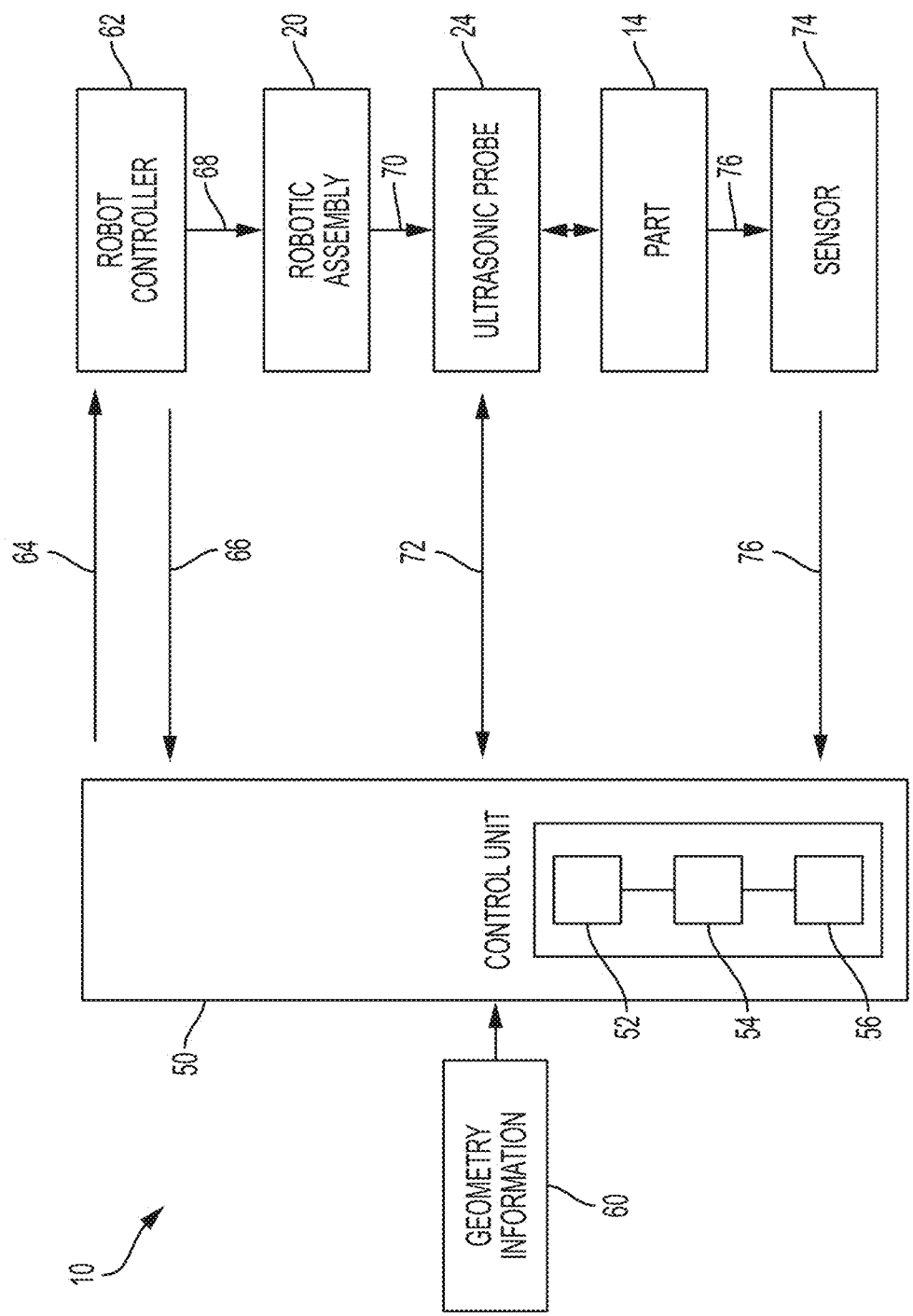
FIG. 2 is a schematic view of the inspection system having a control unit for controlling the robotic assembly and the ultrasonic probe of FIG. 1.

Turning to FIG. 2, a schematic block diagram of an example of the inspection system 10 is illustrated. It will be appreciated that the block diagram of the inspection system 10 is merely exemplary, and is not intended to be limiting. Indeed, the inspection system 10 illustrated in FIG. 2 may include other, un-illustrated structures/components and/or may have a different configurations than as illustrated. In this example, the inspection system 10 may include a control unit 50. The control unit 50 can include a processor 52, memory 54, drive circuitry 56, and/or other components related to performing the inspection of the end region 12 of the part 14.

The processor 52 of the control unit 50 may include a central processing unit (CPU), such as an application-specific integrated circuit (ASIC), a field-programmable gate array (FPGA), or the like. In an example, the processor 52 can include state machine circuitry or other electronic components that are capable of receiving inputs from one or more components (e.g., the drive circuitry 56, etc.).

The memory 54 of the control unit 50 can store one or more computer programs or executable instructions, such as instructions for operating the robotic assembly 20, for performing an ultrasonic scan with the ultrasonic probe 24, a pre-programmed path along which the ultrasonic probe 24 is to be moved with respect to the part 14, geometry information, position information, etc. The memory 54 may include volatile and/or non-volatile memory and can be used for storage of software and/or firmware instructions.

The drive circuitry 56 of the control unit 50 can control one or more of the robotic assembly 20, the ultrasonic probe 24, etc. In an example, one or more components of the control unit 50 (e.g., the processor 52, the memory 54, the drive circuitry 56, etc.) can be coupled together with a bus. In an example, one or more components of the control unit 50 (e.g., the processor 52, the memory 54, the drive circuitry 56, etc.) may be contained in an integrated circuit or other component.

The control unit 50 can receive and/or store geometry information 60. In an example, the geometry information 60 may be related to one or more dimensional characteristics (e.g., size, location, and/or shape) of the part 14, the end region 12 of the part 14, etc. The geometry information 60 may include, for example, dimensions (e.g., a cross-sectional size of the part 14, a length of the part 14 and/or the end region 12, etc.), contours (e.g., channels, grooves, undulations, projections, etc. of the part 14 and/or the end region 12), location of the part 14 and/or the end region 12 with respect to the inspection system 10, etc. In an example, the control unit 50 can receive the geometry information 60 of the part 14 through a user inputting (e.g., via a terminal, a computer, etc.) the geometry information 60 to the control unit 50. In another example, the geometry information 60 can be obtained via a sensing/detection device, such as a camera, a sensor, or the like.

The inspection system 10 may include a robot controller 62. The robot controller 62 can be coupled to the robotic assembly 20, so as to control a movement, a position, etc. of the robotic assembly 20. In an example, the robot controller 62 can include a motor drive circuit that operates the motor(s) of the robotic assembly 20. As an example, the robot controller 62 can receive a path command 64 from the control unit 50. The path command 64 can include instructions and/or a command for movement of the robotic assembly 20. In some examples, the robot controller 62 can include a sensor that detects a position of the robotic assembly 20. The robot controller 62 can transmit position feedback 66 of the robotic assembly 20 to the control unit 50. The position feedback 66 may include, for example, a position of the robotic assembly 20 with respect to the part 14, a position of the ultrasonic probe 24 with respect to the part 14, a position of the fluid delivery structure 34 with respect to the part 14, etc.

The robot controller 62 can control the robotic assembly 20. For example, the robot controller 62 can transmit a robot control signal 68 to the robotic assembly 20, to cause movement of the robotic assembly 20 with respect to the end region 12 of the part 14, movement of the ultrasonic probe 24 with respect to the end region 12 of the part 14, functionality of the fluid delivery structure 34, etc. In an example, the robot control signal 68 can trigger the robotic assembly 20 to move the ultrasonic probe 24 along the path with respect to the end region 12 of the part 14. The robot control signal 68 can likewise trigger the fluid delivery structure 34 to deliver the fluid to the end region 12 of the part 14.

The robotic assembly 20 can control the ultrasonic probe 24. In an example, the robotic assembly 20 can cause the ultrasonic probe 24 to move (e.g., via a probe control signal 70), such as by adjusting the angle of inclination of the ultrasonic probe 24 with respect to the end region 12 of the part 14. Likewise, in these examples, the robotic assembly 20 can move the ultrasonic probe 24 along the path to inspect the end region 12 of the part 14.

The ultrasonic probe 24 can communicate with the control unit 50. In an example, the control unit 50 can selectively trigger the ultrasonic probe 24 via a transmit/receive signal 72 to transmit a signal towards the end region 12 of the part 14. After transmitting the signal, the ultrasonic probe 24 can receive the reflected signal from the end region 12 of the part 14. In an example, the reflected signal can reflect off of a defect within the end region 12, such as cracks, deformities, weaknesses, tube wall changes, etc. After receiving the reflected signal, the ultrasonic probe 24 can transmit the reflected signal 72 to the control unit 50. In some examples, the control unit 50 may include ultrasound electronics for processing the reflected signal and converting the reflected signal into an image of the end region 12.

In a possible example, the inspection system 10 may include a sensor 74 for sensing a position of the ultrasonic probe 24 with respect to the end region 12 of the part 14. The sensor 74 can include any number of different position sensors. The sensor 74 can sense the position of the ultrasonic probe 24, and transmit the position as geometry information 76 to the control unit 50.

The control unit 50 can therefore receive feedback (e.g., via the geometry information 76) related to the position of the ultrasonic probe 24 with respect to the end region 12 of the part 14. Based on this feedback, the control unit 50 can determine a desired position of the ultrasonic probe 24. The control unit 50 can transmit the path command 64 to the robot controller 62 to cause the robotic assembly 20 and, thus, the ultrasonic probe 24 to move with respect to the end region 12 of the part 14.

One aspect of the disclosed content is to harmonize: the position of the ultrasonic probe 24, the geometry of the part 14 and thus the setting of the inspection system 10. This harmonization can be done via setting of logic within the control unit 50. For example, such can be done via a programmable logic controller (PLC) within the control unit 50. The setting can be accomplished via having a protocol between the PLC and the inspection system 24, allowing the PLC to select to either: a) parametrize the inspection system based on geometry and position information or b) select an appropriate ultrasonic shot within a plurality of predefined settings within the inspection system. Alternatively, the inspection system could be connected to the PLC via a protocol to a) parametrize the PLC to drive the ultrasonic probe to a given position or b) select a position within the plurality of potential positions within the PLC function.

Figure 3:
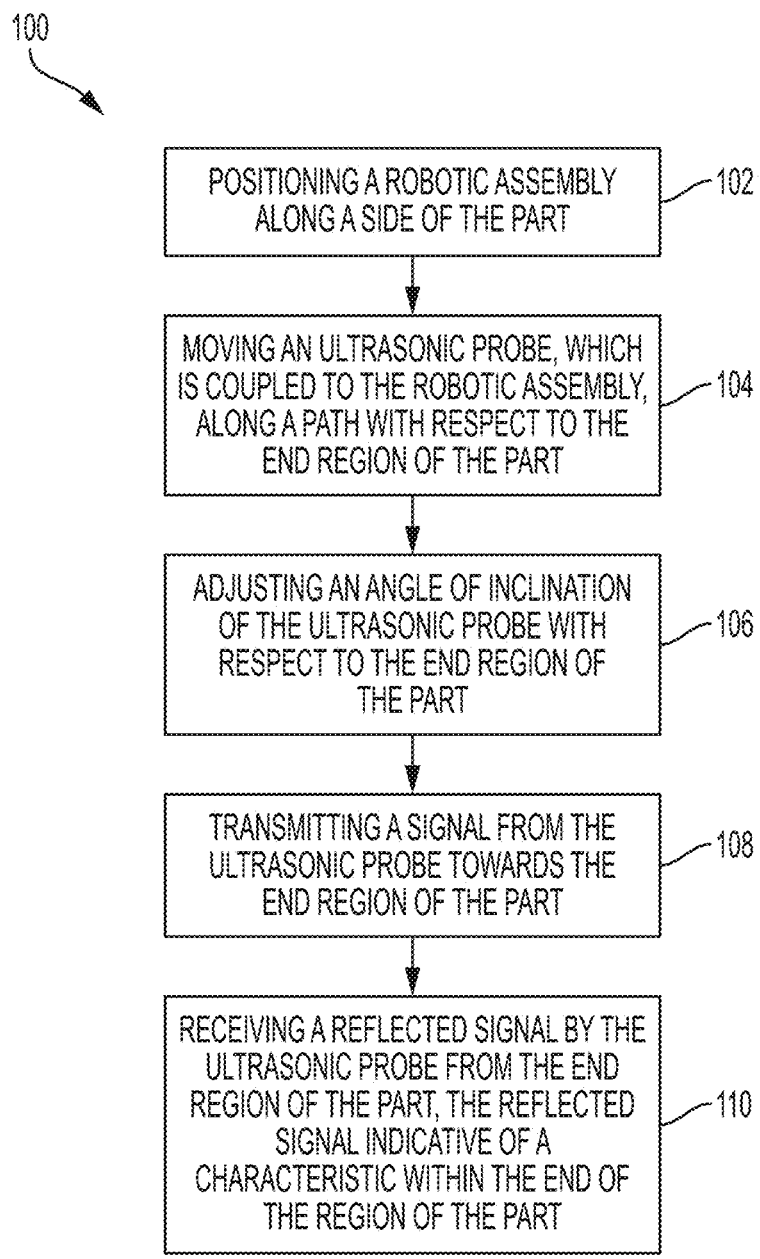
FIG. 3 is a method flow for performing an inspection of an end region of a part.

Turning to FIG. 3, an example method 100 of performing an inspection of the end region 12 of the part 14 is provided. The method 100 includes a step 102 of positioning the robotic assembly 20 along a side of the part 14. In an example, the robotic assembly 20 can be positioned along one side of the part 14 without a need for a second robotic assembly positioned along an opposing side of the part 14. For example, the robotic assembly 20 can be positioned at an outer radial side of the part 14 without a robotic assembly needed to be positioned at an inner radial side of the part 14. Accordingly, in this example, the inspection can be performed from one side of the part 14.

The method 100 includes a step 104 of moving the ultrasonic probe 24, which is coupled to the robotic assembly 20, along a path with respect to the end region 12 of the part 14. In a possible example, the path may include a pre-programmed path, which may be determined prior to the inspection. In another example, the path may not be pre-programmed, such that the path can be adapted/generated during the inspection based, in part, on the geometry of the end region 12 of the part 14.

The method 100 includes a step 106 of adjusting the angle of inclination 30 of the ultrasonic probe 24 with respect to the end region 12 of the part 14. In an example, the robotic assembly 20 can adjust the angle of inclination 30 of the ultrasonic probe 24. By adjusting the angle of inclination 30, the ultrasonic probe 24 can transmit signals towards the part 14 at a variety of different angles so as to inspect a larger area of the end region 12.

The method 100 includes a step 108 of transmitting a signal from the ultrasonic probe 24 towards the end region 12 of the part 14. In an example, the ultrasonic probe 24 may include a phased array probe. Probe elements of the ultrasonic probe 24 can be pulsed at different times, which may cause a plurality of waves to be emitted from the ultrasonic probe 24. These waves can combine into a single wave, which is transmitted through the surface 26 and into the end region 12.

The method 100 includes a step 110 of receiving a reflected signal by the ultrasonic probe 24 from the end region 12 of the part 14. In an example, the reflected signal may be indicative of a characteristic within the end region 12 of the part 14. The signal from the ultrasonic probe 24 reflect off a defect or a feature of within the end region 12 of the part 14, including, for example, cracks, tube wall changes, deformities, weaknesses, back walls, etc. This reflected signal can be received by the ultrasonic probe 24 and transmitted (e.g., via signal 72) to the control unit 50. The control unit 50 can then process the reflected signal and, in some examples, generate an image of the end region 12 of the part 14. In an example, the reflected signal may be indicative of a characteristic within the end region 12, such as one or more of cracks, tube wall changes, deformities, weaknesses, back walls, thicknesses, etc.

Focusing back to the portion of the part 14 that is located at/adjacent to the end 16 of the part, it is to be appreciated that the part 14 can have complex surfaces, contours, thicknesses, junctions, etc. As one example, for an example part that is a tube or pipe, the portion of the part 14 that is located at/adjacent to the end 16 of the part can have an outer diameter that is different (e.g., greater) than an outer diameter of a remainder of the part 14. As another example, for the example part that is a tube or pipe, the portion of the part 14 that is located at/adjacent to the end 16 of the part can have an inner diameter that is different (e.g., smaller) than an outer diameter of a remainder of the part. As another example, for the example part that is a tube or pipe, the portion of the part 14 that is located at/adjacent to the end 16 of the part can have radial thickness that is different (e.g., greater) than a radial thickness of a remainder of the part. As another example, for the example part that is a tube or pipe, a transition junction 100 may be present between the portion of the part 14 that is located at/adjacent to the end 16 of the part and a remainder of the part. The transition junction 100 may include progressive changes in diameter(s) (inner and/or outer) and/or radial thickness. Still further, other complexities, contours, etc. may be present.

Figure 4:
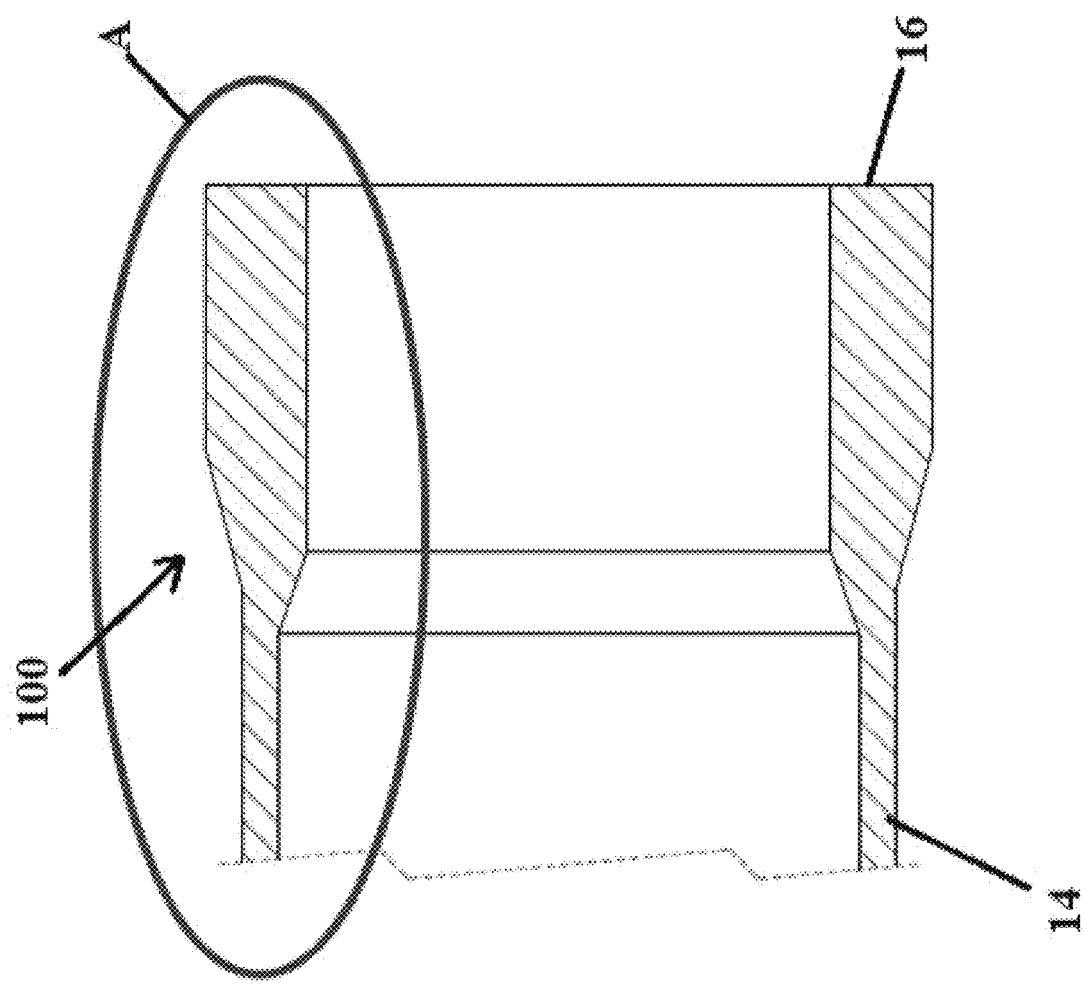
FIG. 4 is a schematic section view of a segment of an example part that can be inspected by the example inspection system shown within FIG. 1, and which example part is a tube or pipe that has complex surfaces, contours, thicknesses, junctions, etc. that are located at/adjacent to an end of the part.

FIG. 4 presents one example of a portion of an example part 14 that is located at/adjacent to the end 16 of the part, that shows some example complexities, contours, etc. Within the shown example, as compared to a remainder of the example part 14, an increased outer diameter is present at the portion of the part 14 that is located at/adjacent to the end 16 of the part, a reduced inner diameter is present at the portion of the part 14 that is located at/adjacent to the end of the part 14, and an increased radial thickness is present at the portion of the part that is located at/adjacent to the end of the part 14. Further, the transition junction 100 is present between the remainder of the example part 14 and the portion of the part 14 that is located at/adjacent to the end 16. Along the transition junction 100 there may be a progressive change in diameter(s) (inner and outer) and radial thickness.

As can be appreciated such complexities, contours, etc. can provide challenges concerning inspection of such an example part 14. However, in accordance with an example aspect of the present disclosure, ultrasonic beam steering and/or focusing may be employed by the example inspection system 10. Such beam steering and/or focusing can be dependent upon geometry and position of the ultrasonic probe 24 relative to the example part 14 and the complexities, contours, etc. thereof. It is further, possible in accordance with another example aspect of the present disclosure, the ultrasonic beam steering and/or focusing may be accomplished via a sensing of such complexities, contours, etc. by the inspection system 10.

Figure 5:
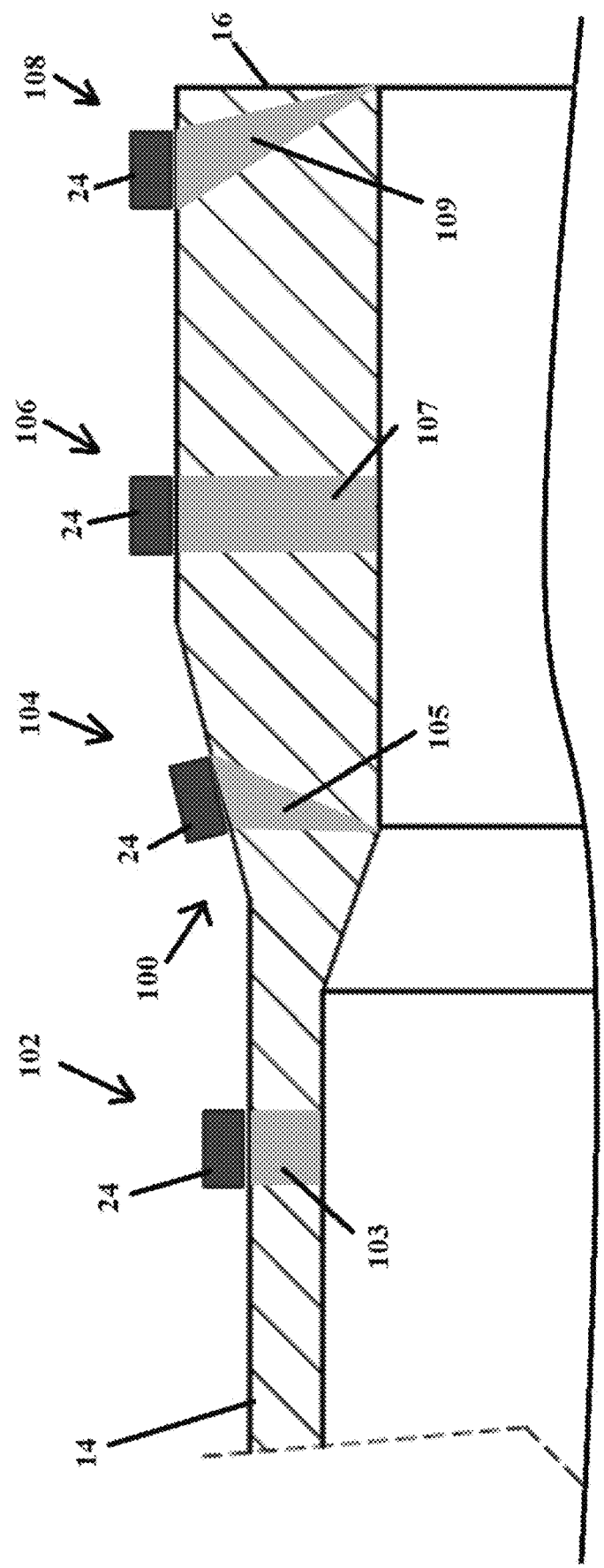
FIG. 5 is an enlarged view of a portion identified as portion A within FIG. 4 and which shows schematic representations of the ultrasonic probe of the example inspection system at four example locations along the part with four respective examples of ultrasonic beam steering/shaping.

FIG. 5 is an enlarged view of a portion identified as portion A within FIG. 4 and which shows schematic representations of the ultrasonic probe 24 of the example inspection system 10 at four example locations 102, 104, 106, 108 along the part with four respective examples of ultrasonic beam steering/shaping. The first example position 102 is such that the ultrasonic probe 24 is adjacent to a portion of the remainder of the part (i.e., other than the portion adjacent to the end). A wall thickness may be less than a thickness at the portion adjacent to the end 16. Also, the thickness is generally uniform. As such, with the shown example, a flat ultrasonic waveform 103 may be employed (i.e., transmitted from the probe 24).

The second example position 104 is such that the ultrasonic probe 24 may be adjacent to the transition junction 100 to the portion adjacent to the end 16 from the remainder of the part. The wall thickness is changed along this transition junction 100. Also, the outer and inner diameters are changed. Still further, there may be abrupt changes at the ends of the transition junction 100. As can be seen within FIG. 5 for the second example position 104, a focused and steered ultrasonic waveform 105 is being employed (i.e., transmitted from the probe 24). Note the example focus and steering is to a location of abrupt change at an end of the transition junction 100 at an inner diameter.

The third example position 106 is such that the ultrasonic probe 24 is adjacent to a portion adjacent to the end 16. A wall thickness may be greater than a thickness at the remainder of the part 14. Also, the thickness is generally uniform. As such, with the shown example, a flat ultrasonic waveform 107 is being employed (i.e., transmitted from the probe 24).

The fourth example position 108 is such that the ultrasonic probe 24 is near to the end 16 of the part 14. As can be seen within FIG. 5 for the fourth example position, a focused and steered ultrasonic waveform 109 is being employed (i.e., transmitted from the probe 24). Note the example focus and steering is to a location at the end 16 of the part.

The example inspection system 10 as described herein is beneficial in a number of ways. For example, the inspection system 10 can provide for an inspection of the end region 12 of the part 14. In the past, inspections by inspection systems were generally limited to body/central portions of a part that were spaced a distance apart from ends of the part. However, in the illustrated examples, the inspection system 10 can perform an inspection adjacent to the end 16 of the part 14, with the end regions having a length of between about 50 millimeters to about 150 millimeters.

Another benefit of the inspection system 10 is that the robotic assembly 20 may include the fluid delivery structure 34. The fluid delivery structure 34 can deliver the coupling fluid to the end region 12 of the part 14 between the ultrasonic probe 24 and the surface 26. As such, the fluid delivery structure 34 allows for fluid coupling between the ultrasonic probe 24 and the surface 26, thus improving the propagation of waves from the ultrasonic probe 24, through the coupling fluid, and to the part 14, and from the part 14, through the coupling fluid, and to the ultrasonic probe 24. With the fluid delivery structure 34 provided, the inspection system 10 no longer requires an immersion tank for conducting an inspection of the part 14. Indeed, in some existing designs, an immersion tank was used for immersing the part 14 so as to improve inspection capability.

Yet another benefit of the inspection system 10 is that the robotic assembly 20 can be positioned along a side of the part 14. Indeed, as illustrated in FIG. 1, the robotic assembly 20 can move the ultrasonic probe 24 along the path on an outer radial side of the part 14. The ultrasonic probe 24 can therefore transmit a signal towards the end region 12 of the part 14, and receive a reflected signal from the end region 12 of the part 14. As such, the non-destructive inspection may occur entirely on one side of the part 14. Such a design reduces the need for a second inspection system to be placed on an opposing second side (e.g., an inner radial side) of the part 14 with respect to the inspection system 10. In past designs, positioning the second inspection system on an inner radial side of the part was difficult to implement and/or costly.

The subject matter disclosed herein has been described with reference to the example embodiments described above. Modifications and alterations will occur to others upon a reading and understanding of this specification. Example embodiments incorporating one or more aspects of the subject matter disclosed herein are intended to include all such modifications and alterations insofar as they come within the scope of the appended claims.

What is claimed:

1. An inspection system, comprising:
   a robotic assembly configured to be positioned along a side of a part;
   an ultrasonic probe coupled to the robotic assembly; and
   a control unit in communication with the robotic assembly and the ultrasonic probe, the control unit configured to:
      receive geometry information related to dimensional characteristics of the part at a central region and an end region extending from a transition junction to a terminal end of the part; and
      transmit first instructions to the robotic assembly, the first instructions being operative to cause the robotic assembly to position the ultrasonic assembly at a first position adjacent to the central region of the part, a second position adjacent to the end region of the part, and a third position adjacent to the transition junction of the part; and
      transmit second instructions to the ultrasonic probe, the second instructions being operative to cause the ultrasonic probe to,
         generate a first ultrasonic beam with a first shape at the first position;
         generate a second ultrasonic beam at the second position that is focused at the terminal end of the part, and
         generate a third ultrasonic beam at the third position that is focused at a geometric change at an inner diameter of the part at an end of the transition region;
      wherein the second and third shapes are different from the first shape.

2. The inspection system of claim 1, wherein the ultrasonic probe comprises a phased array probe.

3. The inspection system of claim 1, wherein an angle of inclination of the ultrasonic probe with respect to the end region of the part is configured to be adjusted by the robotic assembly.

4. The inspection system of claim 1, wherein the ultrasonic probe is configured to be moved by the robotic assembly along a plurality of axes.

5. The inspection system of claim 1, wherein the path along which the ultrasonic probe is moved adapts to a geometry of the end region of the part.

6. The inspection system of claim 1, wherein the path along which the ultrasonic probe is moved comprises a pre-programmed path.

7. The inspection system of claim 1, comprising a fluid delivery structure coupled to the robotic assembly, the fluid delivery structure configured to deliver a fluid to the end region of the part.

8. The inspection system of claim 1, including a programmable logic controller that is set to provide harmonization between the position of the ultrasonic probe and the geometry of the part.

* * * * *